(12) United States Patent
Fujita

(10) Patent No.: US 7,963,359 B2
(45) Date of Patent: Jun. 21, 2011

(54) SWING ARM TYPE SUSPENSION FOR VEHICLE

(75) Inventor: Masayuki Fujita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 568 days.

(21) Appl. No.: 12/019,907

(22) Filed: Jan. 25, 2008

(65) Prior Publication Data

US 2008/0179852 A1   Jul. 31, 2008

(30) Foreign Application Priority Data

Jan. 30, 2007   (JP) ................................. 2007-019836

(51) Int. Cl.
*B62D 61/02* (2006.01)
*B62K 11/00* (2006.01)
*B60G 3/12* (2006.01)

(52) U.S. Cl. ................................. 180/227; 280/124.128

(58) Field of Classification Search .................. 180/227; 280/124.116, 124.128, 124.147, 124.157, 280/283–286
See application file for complete search history.

(56) References Cited

U.S. PATENT DOCUMENTS

| 6,691,814 B2 * | 2/2004 | Toyoda | 180/227 |
| 6,722,461 B2 * | 4/2004 | Gogo | 180/227 |
| 7,178,620 B2 * | 2/2007 | Toyoda | 180/227 |
| 7,472,772 B2 * | 1/2009 | Ozeki | 180/218 |
| 7,559,566 B2 * | 7/2009 | Fujita | 280/284 |
| 7,644,795 B2 * | 1/2010 | Kawamura et al. | 180/219 |

FOREIGN PATENT DOCUMENTS

| EP | 0 417 727 A1 | 3/1991 |
| EP | 0 417 927 A1 | 3/1991 |
| EP | 1 514 787 A1 | 3/2005 |
| JP | 03139488 A * | 6/1991 |
| JP | 2003-291878 A | 10/2003 |

* cited by examiner

*Primary Examiner* — Paul N Dickson
*Assistant Examiner* — Laura Freedman
(74) *Attorney, Agent, or Firm* — Birch, Stewart, Kolasch & Birch, LLP

(57) ABSTRACT

To limit a vehicle-widthwise swing amount of a shock absorber to a smaller amount, thereby reducing the width of a vehicle. When a shock absorber is attached to an upper bracket portion provided on a swing arm via a spherical joint, both the end faces of the upper bracket portion provided on both sides of one end of the shock absorber via gaps are such that the size of the end face in the back-and-forth direction of the vehicle body (i.e., the diameter D of the end face) is greater than the vehicle-widthwise distance S between both the end faces.

18 Claims, 7 Drawing Sheets

SWING ARM TYPE SUSPENSION FOR VEHICLE

CROSS-REFERENCE TO RELATED APPLICATIONS

The present application claims priority under 35 USC 119 to Japanese Patent Application No. 2007-019836 filed on Jan. 30, 2007 the entire contents of which are hereby incorporated by reference.

BACKGROUND OF THE INVENTION

1. Field of the Invention

The present invention relates to an improvement in a swing arm type suspension for a vehicle.

2. Description of Background Art

There is known a conventional swing arm type suspension for a vehicle in which a suspension unit such as a shock absorber together with links are disposed between the lower portion of a body frame and a swing arm which vertically swingably supports a rear wheel relative to the body frame. See, for example, Japanese Patent Laid-open No. 2003-291878.

FIG. 2 of Japanese Patent Laid-open No. 2003-291878 is described below wherein a swing arm 15 is attached, via a pivot shaft 14, to the rear portion of a main frame 12 constituting part of a body frame. The upper end of a suspension unit 16 is attached to the upper portion of the swing arm 15. The lower end of the suspension unit 16 is connected to the lower end of the main frame 12 via a first link 62. The lower portion of the swing arm 15 is connected to an intermediate portion of the first link 62 via a second link 63.

The upper end of the suspension unit 16 is rotatably and swingably connected to the upper portion of the swing arm 15 via a spherical slide bearing. Similarly, the lower end of the suspension unit 16 is rotatably and swingably connected to the first link 62 via a spherical slide bearing.

A reservoir tank 72 is attached to the lower end of the suspension unit 16 so as to extend rearwardly.

The suspension arm 16 is provided with the spherical slide bearings at the upper and lower ends thereof. The reservoir tank 72 is spaced apart from the cylinder shaft of the suspension unit 16. When the suspension unit 16 expands and contracts up and down, the reservoir tank 72 turns around the axis of the suspension unit 16 to largely swing vehicle-widthwise in some cases.

If the sides of the reservoir tank are covered by lower cowls, the lower cowls need to largely expand from side to side so as not to interfere with the reservoir tank 72 swinging vehicle-widthwise. This causes a vehicle body to grow in size.

SUMMARY AND OBJECTS OF THE INVENTION

It is an object of the present invention to limit a vehicle-widthwise swing amount of a shock absorber to a smaller amount, thereby reducing the width of a vehicle.

According to an embodiment of the present invention, in a swing arm type suspension for a vehicle, in which one end of a shock absorber is attached to a swing arm and the other end of the shock absorber is attached to a vehicle body side via a link mechanism, when the shock absorber is attached to a bracket provided on the swing arm via a spherical joint, both end faces of the bracket provided on both sides of one end of the shock absorber via gaps are such that a size of the end face in the back-and-forth direction of a vehicle body is greater than a vehicle-widthwise distance between the end faces.

In operation, the size of the bracket side end face in the back-and-forth direction of a vehicle body is greater than the vehicle-widthwise distance between both the end faces on the bracket side. Thus, the end of the shock absorber is allowed to hit against both the end faces on the bracket side to limit the vehicle-widthwise swing of the shock absorber to a smaller angle.

According to an embodiment of the present invention, a reservoir tank is disposed at an upper end of the shock absorber so as to extend toward the rearward of the vehicle body and an upper surface of the swing arm is provided with a recessed portion so as to avoid interference with the reservoir tank.

In operation, since the vehicle-widthwise swing amount of the shock absorber is limited to a smaller amount, the vehicle-widthwise size of the recessed portion can be reduced to increase the cross-sectional area of the swing arm. If the cross-sectional area of the swing arm can uniformly be ensured, the width of the swing arm can be reduced.

According to an embodiment of the present invention, the recessed portion overlaps the reservoir tank as viewed from the side.

In operation, if the reservoir tank is disposed in the recessed portion, the vehicle-widthwise size of the recessed portion can be reduced to increase the cross-sectional area of the swing arm. If the cross-sectional area of the swing arm is uniformly ensured, the width of the swing arm can be reduced.

According to an embodiment of the present invention, when the shock absorber is attached to the bracket provided on the swing arm via the spherical joint, both end faces of the bracket provided on both sides of one end of the shock absorber via gaps are such that a size of the end face in the back-and-forth direction of a vehicle body is greater than a vehicle-widthwise distance between the end faces. Thus, the vehicle-widthwise swing amount of the shock absorber can be limited to a smaller amount. Consequently, the width of the vehicle can be reduced to make it easy for an occupant to mount on or dismount from the vehicle.

According to an embodiment of the present invention, a reservoir tank is disposed at an upper end of the shock absorber so as to extend toward the rear of the vehicle body and an upper surface of the swing arm is provided with a recessed portion so as to avoid interference with the reservoir tank. Thus, the vehicle-widthwise swing amount of the shock absorber can be limited to a smaller amount to reduce the vehicle-widthwise size of the recessed portion. The cross-sectional area of the swing arm can be increased to easily ensure the rigidity of the swing arm. If the cross-sectional area of the swing arm is uniformly ensured, the vehicle widthwise size of the swing arm can be reduced to reduce the width of the vehicle.

According to an embodiment of the present invention, the recessed portion overlaps the reservoir tank as viewed from the side. Thus, the vehicle-widthwise swing amount of the reservoir tank disposed in the recessed portion is reduced to reduce the vehicle-widthwise size of the recessed portion. In addition, the cross-sectional area of the swing arm is increased to ensure the rigidity of the swing arm. If the cross-sectional area of the swing arm is uniformly ensured, the vehicle-widthwise size of the swing arm can be reduced to reduce the width of the vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
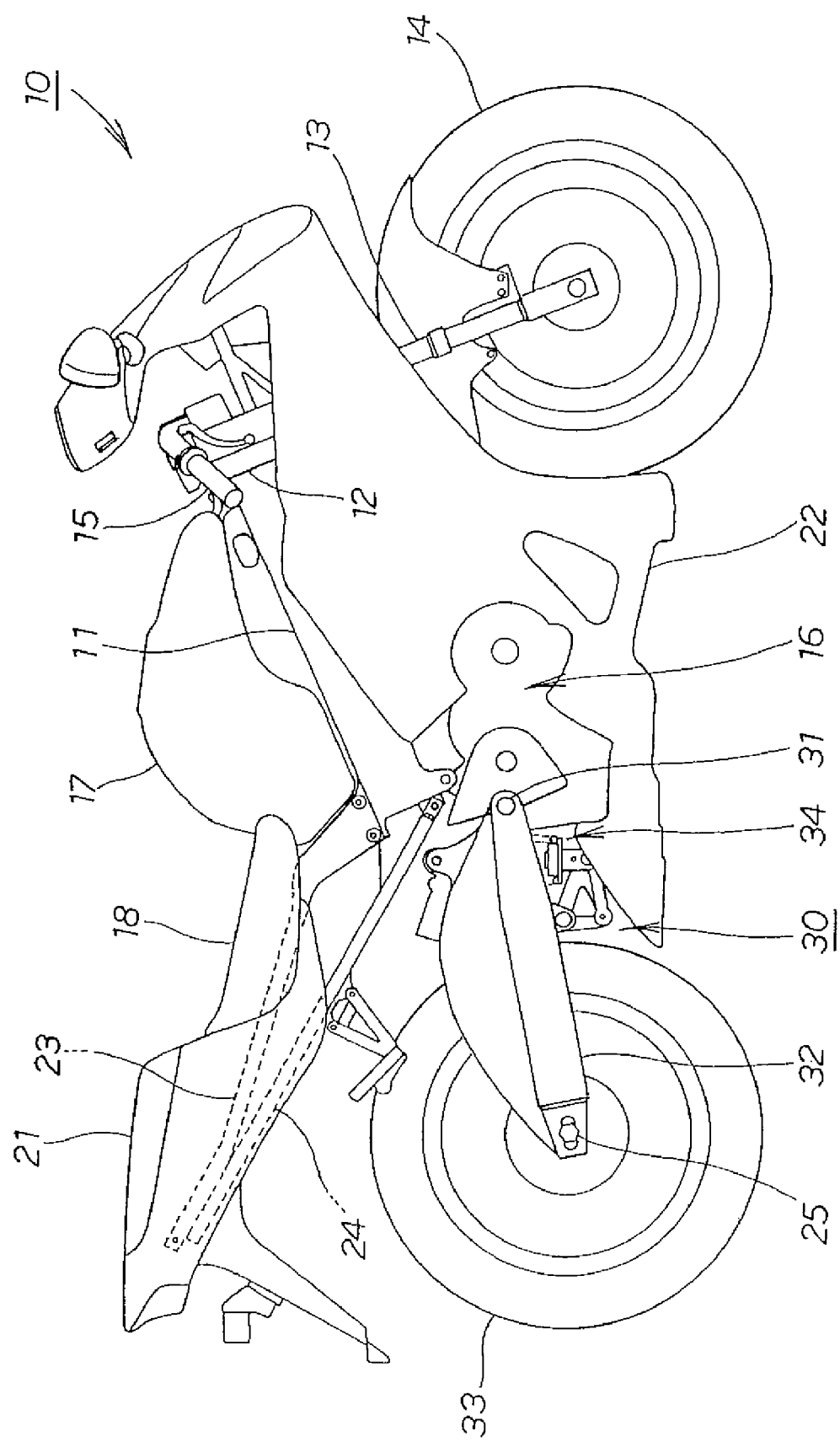
FIG. 1 is a lateral view of a vehicle provided with a swing arm type suspension according to the present invention.

A best mode for carrying out the invention will hereinafter be described with reference to the accompanying drawings. It is to be noted that the drawings shall be viewed based on the direction of reference numerals.

FIG. 1 is a lateral view of a vehicle provided with a swing arm type suspension according to the present invention. A vehicle 10 is a motorcycle which includes a main frame 11, a head pipe 12 provided on the front end of the main frame 11, a front fork 13 steerably attached to the head pipe 12, a front wheel 14 attached to the lower end of the front fork 13 and a handlebar 15 attached to the upper portion of the front fork 13. The motorcycle further includes a power unit 16 mounted on the lower portion of the main frame 11, a swing arm type suspension 30 mounted to the rear portion of the power unit 16, a rear wheel 33 supported by this suspension 30, a fuel tank 17 mounted on top of the main frame 11 and seats 18, 21 disposed to the rear of the fuel tank 17. A cowling 22 is provided together with a seat frame 23 and a sub-frame 24 extending to the rear and obliquely upwardly from the rear portion of the main frame 11. A rear wheel axle 25 is provided.

The swing arm type suspension 30 includes a pivot shaft 31, a swing arm 32, a shock absorber 34 and a link mechanism. The pivot shaft 31 is provided at the rear portion of the power unit 16. The swing arm 32 is swingably attached to the pivot shaft 31 so as to have a rear end supporting the rear wheel 33. The shock absorber 34 has an upper end attached close to the pivot shaft 31 of the swing arm 32 to absorb impact for preventing the impact from being transmitted to a vehicle body through the rear wheel 33 and the swing arm 32. The link mechanism (detailed later) connects the lower end of the shock absorber 34 with the lower portion of the power unit 16.

Figure 2:
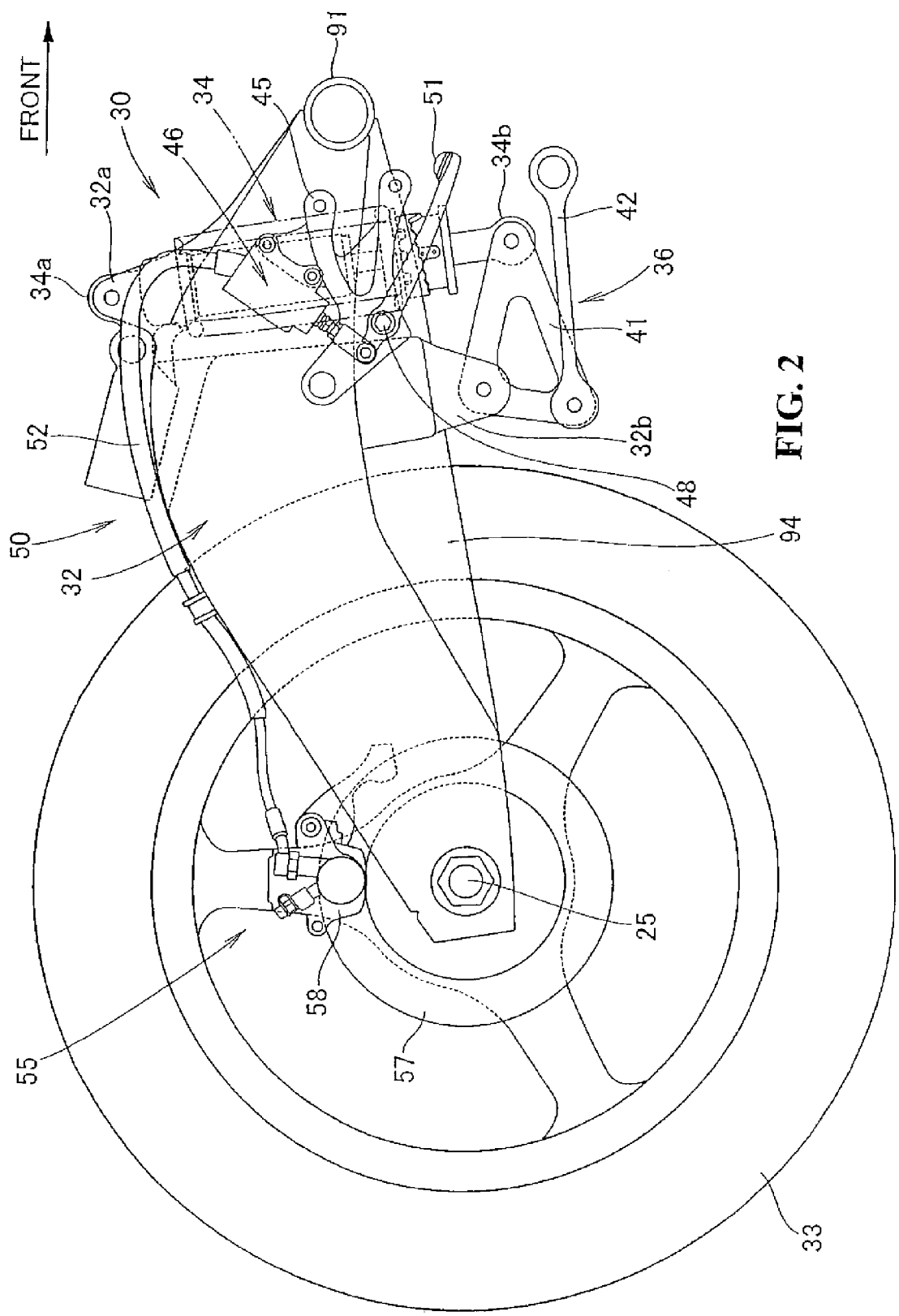
FIG. 2 is a lateral view of an essential portion of the swing arm type suspension according to the present invention.

FIG. 2 is a lateral view illustrating an essential portion of the swing arm type suspension according to the present invention (arrow "FRONT" in the figure indicates the front of the vehicle, which applies to the following). The shock absorber 34 is disposed to vertically pass through the front portion of the swing arm 32. An upper end portion 34a of the shock absorber 34 is swingably attached to an upper bracket portion 32a provided integrally with the upper portion of the swing arm 32. The link mechanism 36 is connected to a lower bracket portion 32b provided integrally with the lower portion of the swing arm 32 and to a lower end 34b of the shock absorber 34. In addition, the link mechanism 36 is connected to the lower portion of the power unit 16 (see FIG. 1).

The link mechanism 36 includes a triangular first link 41 and a second link 42. The first link 41 has one corner portion swingably connected to the lower bracket portion 32b of the swing arm 32 and another corner portion swingably connected to the lower end 34b of the shock absorber 34. The second link 42 has one end swingably connected to the other corner portion of the first link 41 and the other end swingably connected to the power unit 16.

A master cylinder 46 attached to the power unit 16 via a side bracket 45 is disposed laterally to (on the front side of) the swing arm 32.

The master cylinder 46 is a component constituting part of rear wheel brake equipment 50. The brake equipment 50 includes a brake pedal 51, the master cylinder 46, a brake pipe 52 and a disk brake device 55. The brake pedal 51 is swingably attached to a support shaft 48 attached to the side bracket 45. The master cylinder 46 is attached to the rear portion of the brake pedal 51. The brake pipe 52 extends rearwardly from the master cylinder 46 to run along the upper surface of the swing arm 32. The disk brake device 55 is connected to the rear end of the brake pipe 52.

The brake disk device 55 includes a brake disk 57 integrally attached to the rear wheel 33 and a brake caliper 58 attached to the swing arm 32 and to the rear wheel axle 25 for braking the brake disk 57.

Figure 3:
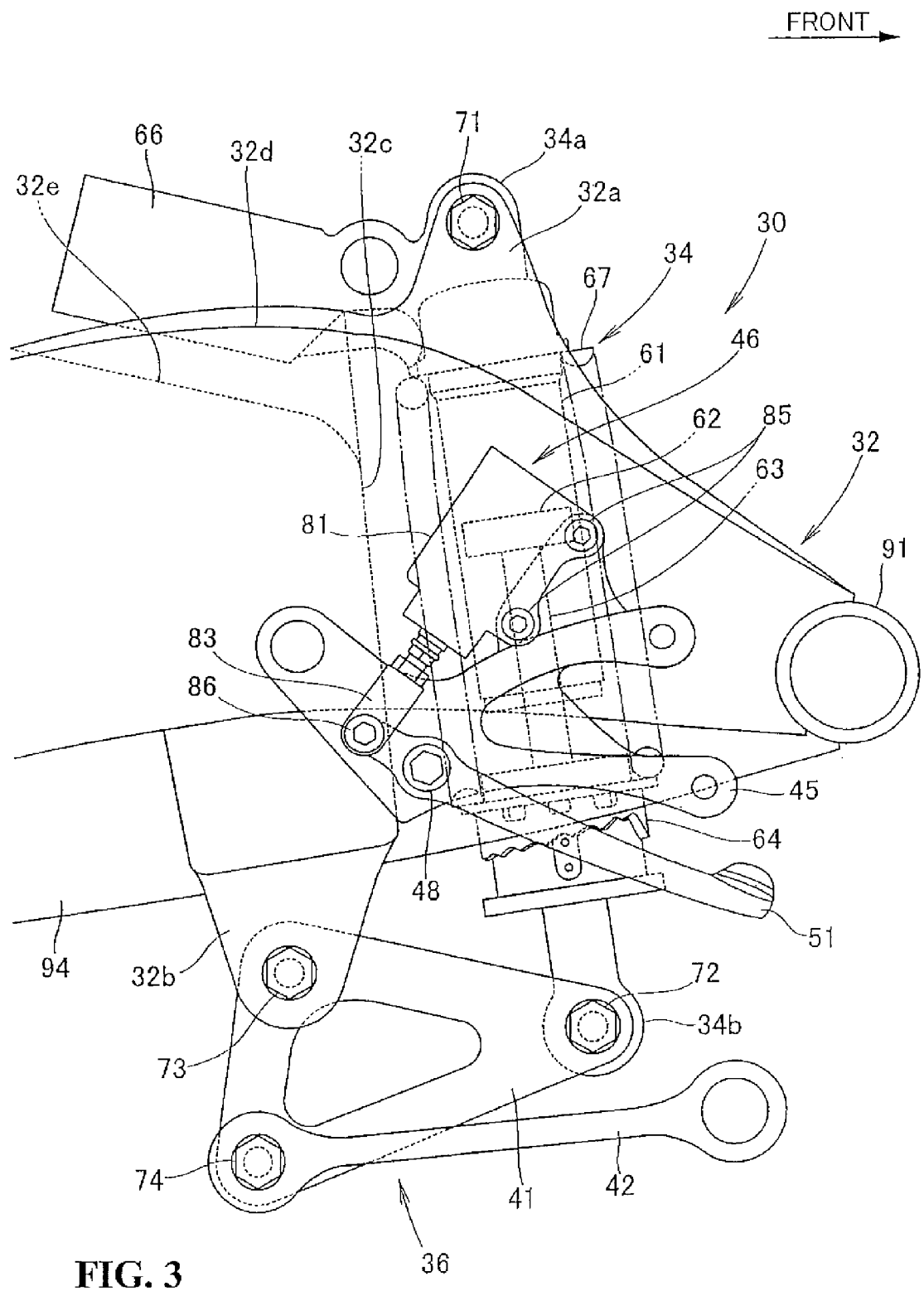
FIG. 3 is a lateral view of essential portions of the swing arm type suspension and a rear wheel braking device according to the present invention.

FIG. 3 is a lateral view illustrating essential portions of the swing arm type suspension and the rear wheel brake equipment according to the present invention. The swing arm 32 is provided with a hole portion 32c vertically passing through the front portion thereof. In addition, the swing arm 32 is provided with a recessed portion 32e that is to the rear of the hole portion 32c and in an upper surface 32d thereof so as to face the hole portion 32c. Most of the shock absorber 32 is disposed in the hole portion 32c so as to extend upward and downward. The lower portion of the reservoir tank 66 of the shock absorber 32 is disposed in the recessed portion 32e. In short, the reservoir tank 66 and the recessed portion 32e overlap each other as viewed from the side.

The shock absorber 34 includes a cylinder portion 61, a piston 62 inserted in the cylinder portion so as to be movable therein; a piston rod 63 attached to the piston 62, a rod end member 64 attached to the end of the piston rod 63, a reservoir tank 66 integrally attached to the cylinder portion 61 so as to extend toward the rear of the vehicle and a compression coil spring 67 interposed between the upper portion of the cylinder portion 61 and the rod end member 64. The upper end portion 34a provided for the cylinder portion 61 is attached to the swing arm 32 and the lower end 34b provided for the rod end member 64 is attached to the first link 41.

A bolt 71 serves as a joint between the upper bracket portion 32a of the swing arm 32 and the upper end portion 34a of the shock absorber 34. A bolt 72 serves as a joint between the lower end 34b of the shock absorber 34 and the first link 41. A bolt 73 serves as a joint between the lower bracket portion 32b of the swing arm 32 and the first link 41. A bolt 74 serves as a joint between the first link 41 and the second link 42.

The master cylinder 46 includes a cylinder main body 81 provided integrally with a reservoir tank (not shown), a piston (not shown) inserted in the cylinder main body 81 so as to be movable therein and a push rod member 83 connected to the piston. The cylinder main body 81 is attached to the side bracket 45 with bolts 85, 85 and the push rod member 83 is swingably attached to the rear end of the brake pedal 51 with a bolt 86.

Figure 4:
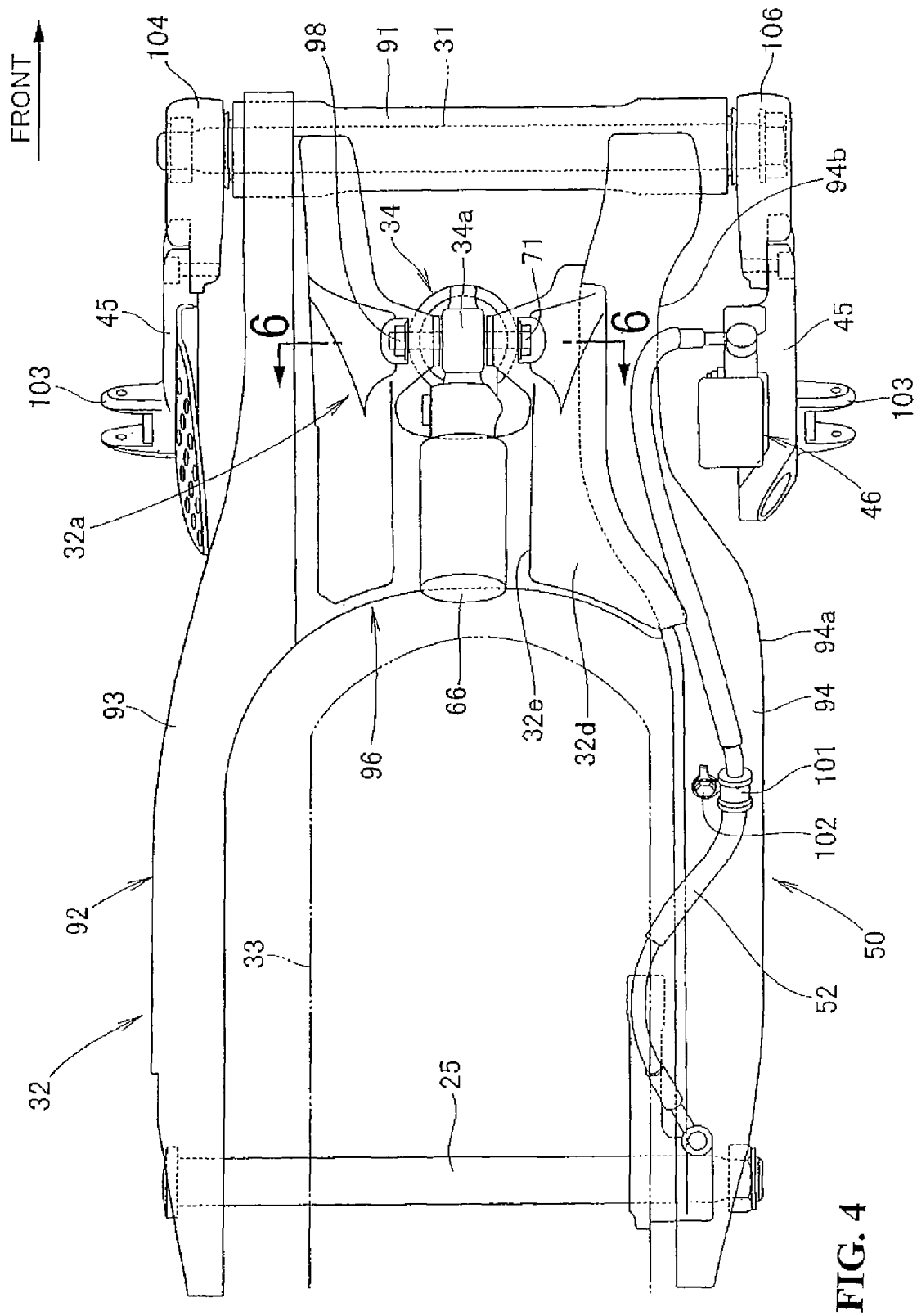
FIG. 4 is a plan view of the essential portion of the swing arm type suspension according to the present invention.

FIG. 4 is a plan view illustrating an essential portion of the swing arm type suspension according to the present invention. The swing arm 32 includes a tubular member rotatably attached to the pivot shaft 31 and an arm main body 92 attached to the tubular member 9l. The arm main body 92 includes a left arm 93, a right arm 94 and a connecting portion 96 which connects the left arm 93 with the right arm 94.

The left arm 93 and the right arm 94 support the rear wheel axle 25 with the rear end portions thereof.

The connecting portion 96 is provided integrally with the upper bracket portion 32a supporting the upper end of the shock absorber 34 and with a recessed portion 32e in the upper surface 32d to avoid interference with the shock absorber 34. A nut 98 is screwed to the end of the bolt 71.

A recessed portion 94b is formed, so as to avoid the master cylinder 46, at the front portion of the right arm 94, namely, at a lateral surface 94a of the right arm 94 on the side where the master cylinder 46 of the rear wheel brake equipment 50 is disposed. Thus, a laterally protruding amount of the master cylinder 46 and of the side bracket 45 supporting the master cylinder 46 can be reduced to prevent an increase in the width of the vehicle. A fixing member 101 and a bolt 102 are provided for fixing the intermediate portion of the brake pipe 52 to the right arm 94. Step support portions 103, 103 are provided at the side brackets 45 to attach steps thereto. Rearward projecting portions 104, 106 are provided on the power unit 16 to attach the swing arm 32 thereto.

A conventional swing arm, e.g. the swing arm 15 shown in FIG. 2 of Japanese Patent Laid-open No. 2003-291878 is not provided with a recessed portion to avoid interference with the master cylinder for the rear wheel brake equipment, on the lateral surface of the left or right arm constituting part of the swing arm 15. Thus, if the master cylinder is disposed laterally to the left or right arm, the vehicle width is likely to increase.

Figure 5:
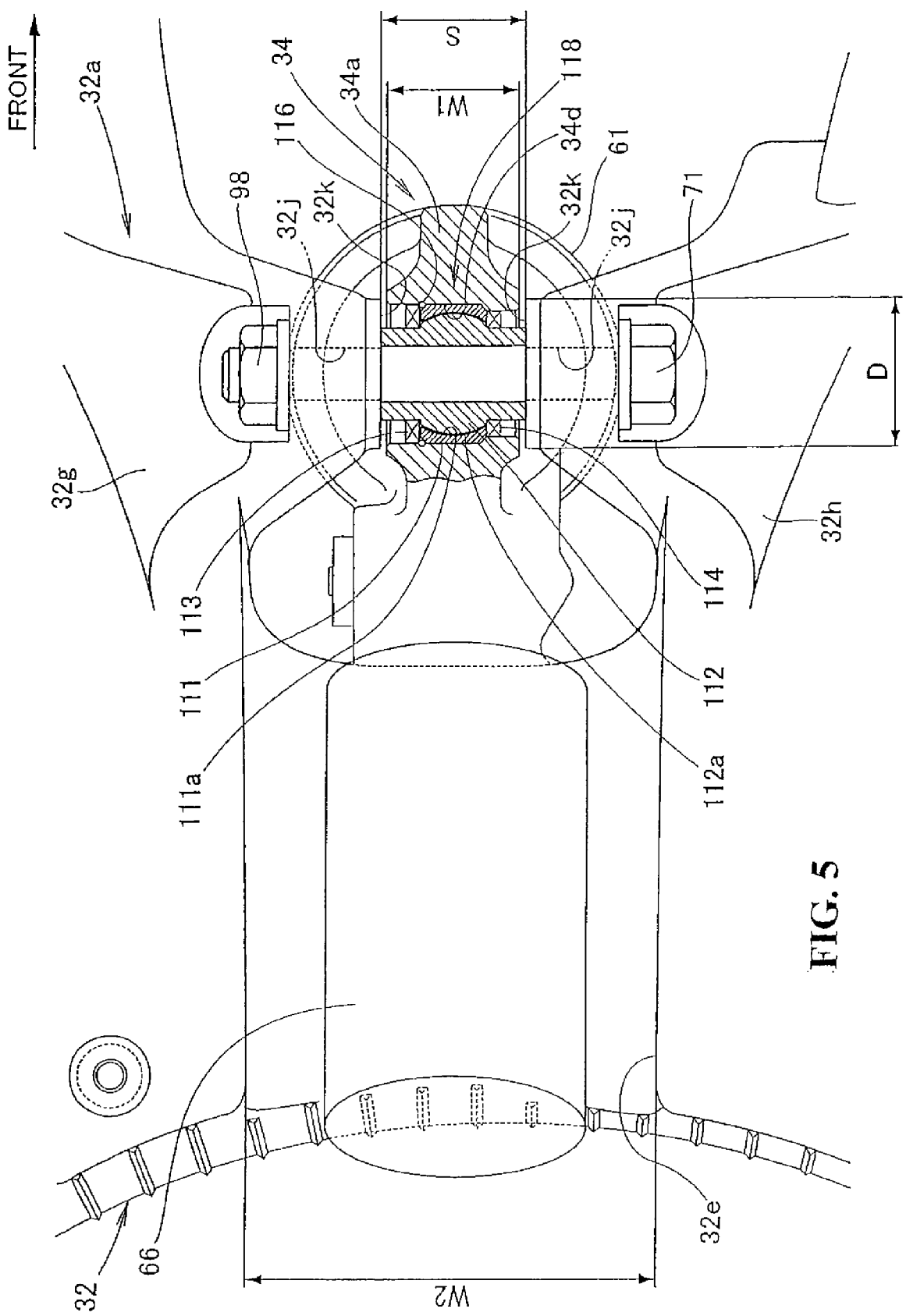
FIG. 5 is an essential plan view illustrating a state where a shock absorber is attached to a swing arm according to the present invention.

FIG. 5 is an essential plan view (partial cross-sectional view) illustrating a state where the shock absorber is attached to the swing arm according to the present invention. The upper bracket portion 32a of the swing arm 32 is composed of a left bracket portion 32g and a right bracket 32h. The left bracket portion 32g and the right bracket 32h are each bored with a bolt insertion hole 32j.

If a diameter of an end face 32k of each of the left bracket portion 32g and the right bracket 32 is D and the distance between the end face 32k of the left bracket portion 32g and the end face 32k of the right bracket 32h is S, D>S.

If a widthwise size, namely, a width of the upper end portion 34a of the shock absorber 34 is W1, S>W1. A gap is present between each of the end faces 32k, 32k and the upper end portion 34a.

Accordingly, the reservoir tank 66 is swingable in the vehicle-width direction. When the reservoir tank 66 swings in the vehicle-width direction, the upper end portion 34a hits against the end faces 32k, 32k to restrict the swing and come to a stop. In other words, a vehicle-widthwise swing amount of the reservoir tank 66 is determined by the diameters D of the end faces 32k, 32k, the distance S and the width W1 of the upper end portion 34a.

The upper end portion 34a of the shock absorber 34 includes an outer race 111, an inner race 112, seal members 113, 114 and a retaining ring 116. The outer race 111 is fitted into a stepped hole portion 34d bored perpendicularly to the cylinder axis (the axis vertical to the sheet surface) of the cylinder portion 61. The inner race 112 is formed with a spherical outer surface 112a to be slidably fitted to a spherical inner surface 111a formed in the outer race 111. The seal members 113 and 114 are disposed to put the sliding portion between the outer race 111 and the inner race 112 therebetween so as to prevent dust from entering the sliding portion. The retaining ring 116 is fitted to the stepped hole portion 34d to prevent the outer race 111 from falling off.

The outer race 111 and the inner race 112 are components constituting part of the spherical joint (namely, the spherical slide bearing) 118.

Symbol W2 in the FIG. 5 denotes a vehicle-widthwise minimum size, namely, a minimum width of the recessed portion 32e of the swing arm 32.

Figure 6:
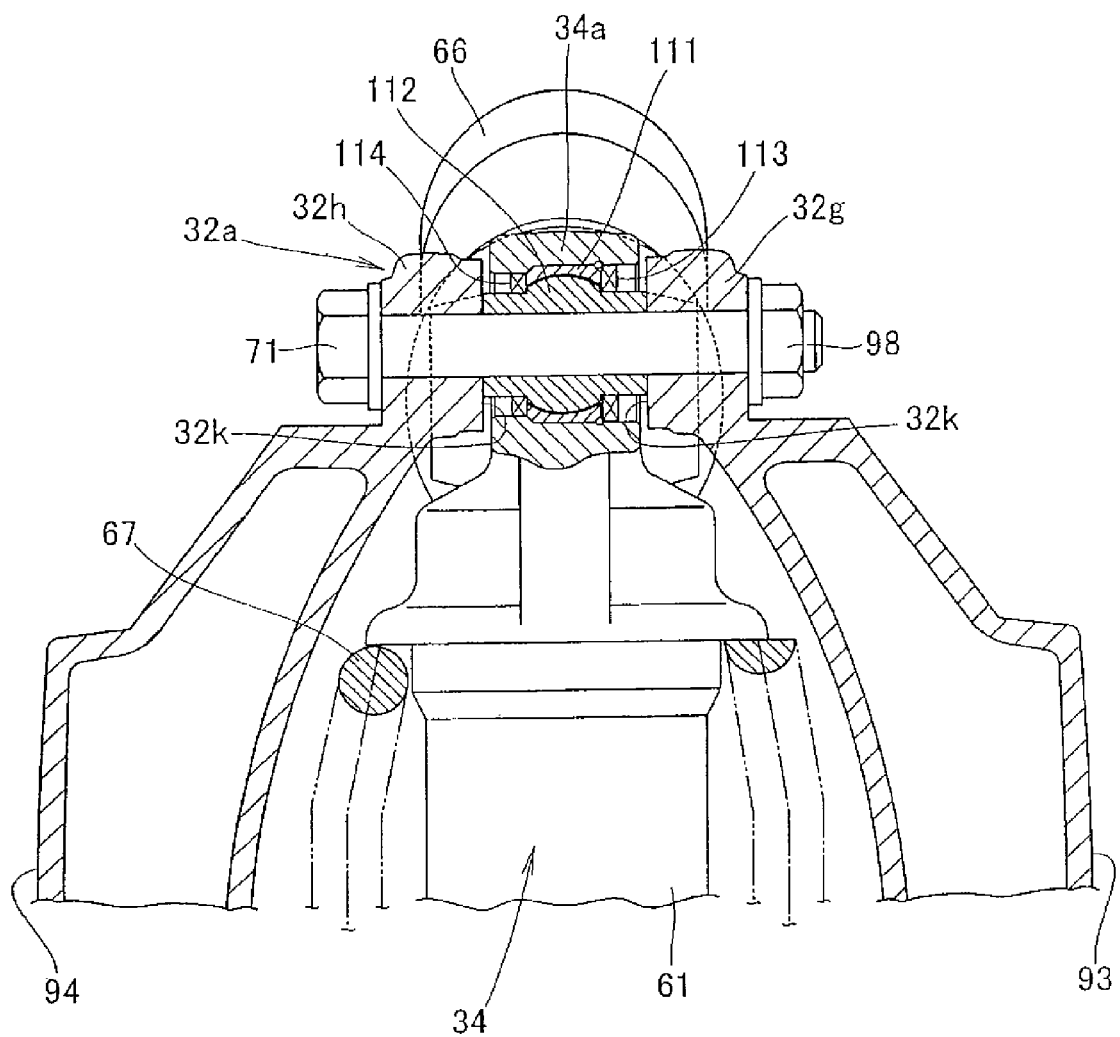
FIG. 6 is a cross-sectional view taken along line 6-6 of FIG. 4.

FIG. 6 is a cross-sectional view taken along line 6-6 of FIG. 4. The left arm 93 is formed integrally with the left bracket portion 32g at the upper portion thereof. Similarly, the right arm 94 is formed integrally with the right bracket 32h at the upper portion thereof. The upper end portion 34a of the shock absorber 34 is secured to the left bracket portion 32g and right bracket 32h with the bolt 71 and a nut 98.

A description is next made of the operation of the upper bracket portion 32a described above.

Figure 7:
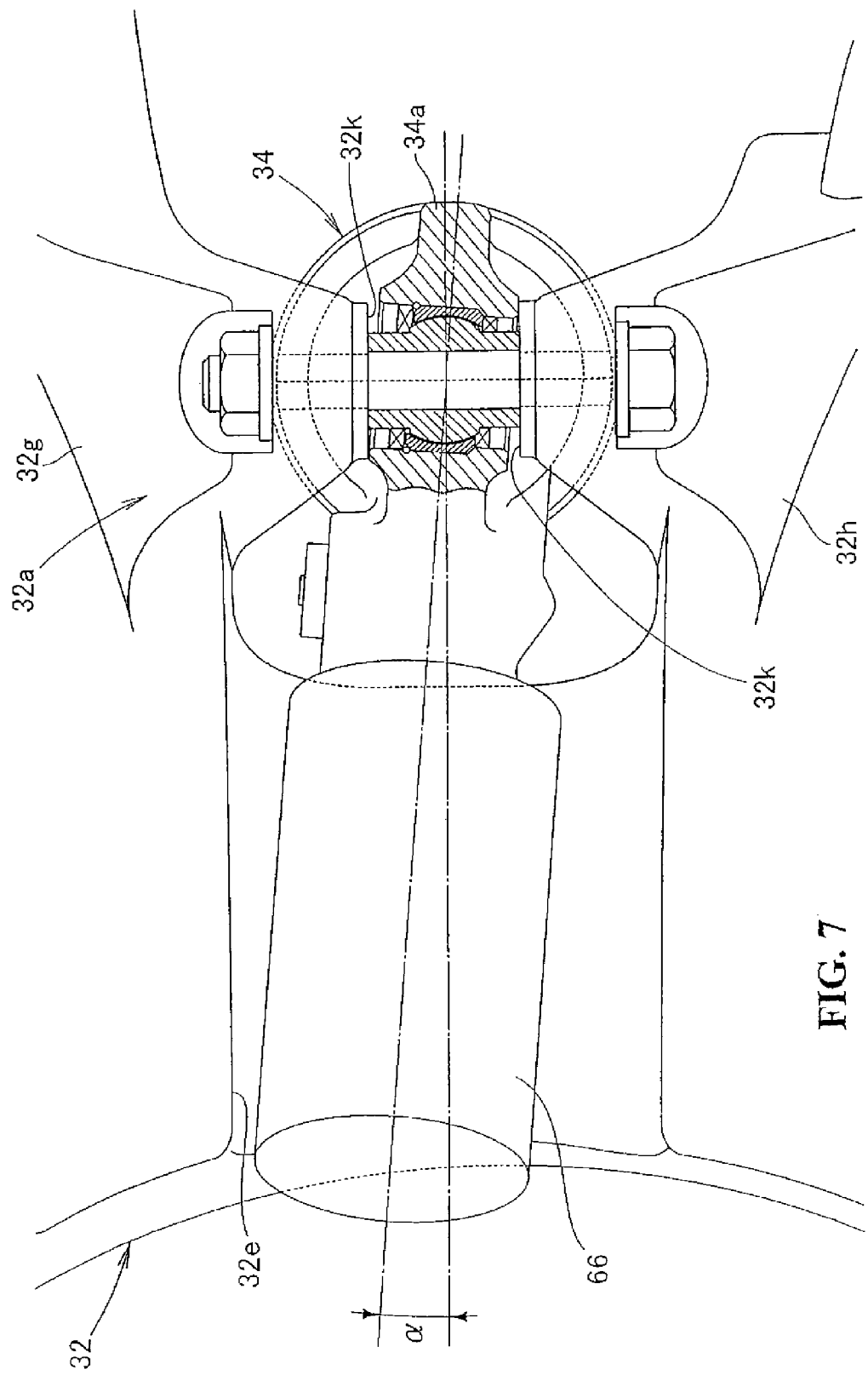
FIG. 7 is an operational diagram illustrating operation of an upper bracket portion according to the present invention.

FIG. 7 is an operational diagram illustrating the operation of the upper bracket portion according to the present invention.

When the swing arm 32 swings up and down, the shock absorber 34 expands and contracts and concurrently the reservoir tank 66 of the shock absorber 34 may swing vehicle-widthwise because the upper end portion 34a and the lower end portion 34b (see FIG. 3) are each supported by the spherical slide bearing.

The maximum swing angle of the reservoir tank 66 is restricted by the diameter D of each end face 32k, 32k of the upper bracket portion 32a (see FIG. 5), the distance S (see FIG. 5) and the width W1 (see FIG. 5) of the upper end portion 34a of the shock absorber 34. When the upper end portion 34a hits against the end face 32k, 32k, the maximum swing angle occurs. The maximum swing angle is α in this case.

Conventionally, D←S. However, since D>S in the present invention, the maximum swing angle of the reservoir tank 66 can be suppressed. The minimum width W2 (see FIG. 5) of the recessed portion 32e of the swing arm 32 can be reduced. Thus, the cross-sectional area of the swing arm 32 can be reduced and the rigidity of the swing arm 32 can be increased. If the cross-sectional area of the swing arm 32 can uniformly be ensured, the vehicle-widthwise size of the swing arm can be reduced, which can make vehicle-width smaller.

As shown in FIGS. 3 and 5, the present invention is firstly characterized in that in the swing arm type suspension 30 of the vehicle 10 (see FIG. 1) in which one end of the shock absorber 34 is attached to the swing arm 32 and the other end of the shock absorber 34 is attached to the vehicle body side via the link mechanism 36, when the shock absorber 34 is attached to the upper bracket portion 32a as a bracket provided on the swing arm 32 via the spherical joint 118, both the end faces 32k, 32k of the upper bracket portion 32a provided on both sides of one end of the shock absorber 34 are such that the size of the end face 32k in the back-and-forth direction of the vehicle body (i.e., the diameter D of the end face 32k) is greater than the vehicle-widthwise distance S between both the end faces 32k, 32k.

Accordingly, the vehicle-widthwise swing amount of the shock absorber 34 can be limited to a smaller amount. Thus, the width of the vehicle 10 can be reduced to make it easy for an occupant to mount on or dismount from the vehicle.

The present invention is secondly characterized in that the reservoir tank 66 is disposed at the upper end of the shock absorber 34 so as to extend toward the rear of the vehicle body and the upper surface 32d of the swing arm 32 is provided with the recessed portion 32e so as to avoid interference with the reservoir tank 66.

Accordingly, the vehicle-widthwise swing amount of the shock absorber 34 can be limited to a smaller amount. Thus, the vehicle-widthwise size of the recessed portion 32e and the cross-sectional area of the swing arm 32 is increased to easily ensure the rigidity of the swing arm 32. If the cross-sectional area of the swing arm 32 is uniformly ensured, the vehicle-widthwise size of the swing arm can be reduced to reduce the width of the vehicle.

The present invention is thirdly characterized in that the recessed portion 32e overlaps the reservoir tank 66 as viewed from the side.

Accordingly, the vehicle-widthwise swing amount of the reservoir tank 66 disposed in the recessed portion 32e is reduced to reduce the vehicle-widthwise size of the recessed portion. In addition, the cross-sectional area of the swing arm 32 is increased to ensure the rigidity of the swing arm 32. If the cross-sectional area of the swing arm 32 is uniformly ensured, the vehicle-widthwise size of the swing arm 32 can be reduced to reduce the width of the vehicle.

In addition, as shown in FIG. 5, in the present embodiment, the end face 32k of the left bracket portion 32g and the right bracket 32h is formed in a circle having a diameter D. However, the present invention is not limited to this embodiment. The end face 32k may be formed in a rectangle, an oval, other shapes similar to them, or a shape other than them. In short, it is only needed that the vehicle body back-and-forth direction of the end face is D.

The swing arm type suspension of the present invention is suitable for motorcycles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A swing arm suspension for a vehicle, in which one end of a shock absorber is attached to a swing arm and the other end of the shock absorber is attached to a vehicle body side via a link mechanism, comprising:
a bracket provided on the swing arm, said shock absorber being connected to the bracket via a spherical joint, said bracket including two end faces wherein one of the end faces of the bracket is provided on one of each side of one end of the shock absorber via a gap located between each side of the one end of the shock absorber and an associated end face of the bracket, such that a size of the end faces in the back-and-forth direction of a vehicle body is greater than a vehicle-widthwise distance between the end faces, wherein
a reservoir tank is disposed at an upper end of the shock absorber so as to extend toward a rear of the vehicle body and an upper surface of the swing arm is provided with a recessed portion so as to avoid interference with the reservoir tank.

2. The swing arm suspension according to claim 1, wherein the recessed portion overlaps the reservoir tank as viewed from a side view of the vehicle.

3. The swing arm suspension according to claim 1, wherein the shock absorber includes an upper end portion for engaging with an end face when the shock absorber is moved in a vehicle-widthwise direction for limiting the movement of the reservoir tank.

4. The swing arm suspension according to claim 3, wherein a vehicle-widthwise swing amount is determined by a diameter of the end faces, a vehicle-widthwise distance between the end faces and a width of the upper end portion.

5. The swing arm suspension according to claim 4, wherein a maximum swing angle of the reservoir tank is an angle θ determined by the engagement of the upper end portion with one of the end faces.

6. The swing arm suspension according to claim 4, wherein the diameter of the end faces is greater than the vehicle-widthwise distance between the end faces.

7. The swing arm suspension according to claim 1, wherein the spherical joint includes an outer race, an inner race, seal members and a retaining ring for mounting the shock absorber on the bracket.

8. The swing arm suspension according to claim 7, wherein the outer race is fitted into a stepped hole portion bored perpendicularly to a cylinder portion of the shock absorber.

9. The swing arm suspension according to claim 1, wherein the swing arm includes an aperture wherein the shock absorber is disposed within said aperture to extend upwardly and downwardly.

10. A swing arm suspension for use with a vehicle, comprising:
a shock absorber;
a first end of said shock absorber being adapted to be attached to a swing arm;
a second end of the shock absorber being adapted to be attached to a vehicle body side via a link mechanism;
a bracket provided on the swing arm, said shock absorber being connected to the bracket via a spherical joint, said bracket including end faces provided on both sides of one end of the shock absorber, a diameter of the end faces being greater than a vehicle-widthwise distance between the end faces, wherein a reservoir tank is disposed at an upper end of the shock absorber so as to extend toward a rear of the vehicle body and an upper surface of the swing arm is provided with a recessed portion so as to avoid interference with the reservoir tank.

11. The swing arm suspension according to claim 10, wherein the recessed portion overlaps the reservoir tank as viewed from a side view of the vehicle.

12. The swing arm suspension according to claim 10, wherein the shock absorber includes an upper end portion for engaging with an end face when the shock absorber is moved in a vehicle-widthwise direction for limiting the movement of the reservoir tank.

13. The swing arm suspension according to claim 12, wherein a vehicle-widthwise swing amount is determined by a diameter of the end faces, a vehicle-widthwise distance between the end faces and a width of the upper end portion.

14. The swing arm suspension according to claim 13, wherein a maximum swing angle of the reservoir tank is an angle θ determined by the engagement of the upper end portion with one of the end faces.

15. The swing arm suspension according to claim 13, wherein the diameter of the end faces is greater than the vehicle-widthwise distance between the end faces.

16. The swing arm suspension according to claim 10, wherein the spherical joint includes an outer race, an inner race, seal members and a retaining ring for mounting the shock absorber on the bracket.

17. The swing arm suspension according to claim 16, wherein the outer race is fitted into a stepped bole portion bored perpendicularly to a cylinder portion of the shock absorber.

18. The swing arm suspension according to claim 10, wherein the swing arm includes an aperture wherein the shock absorber is disposed within said aperture to extend upwardly and downwardly.

* * * * *